UNITED STATES PATENT OFFICE.

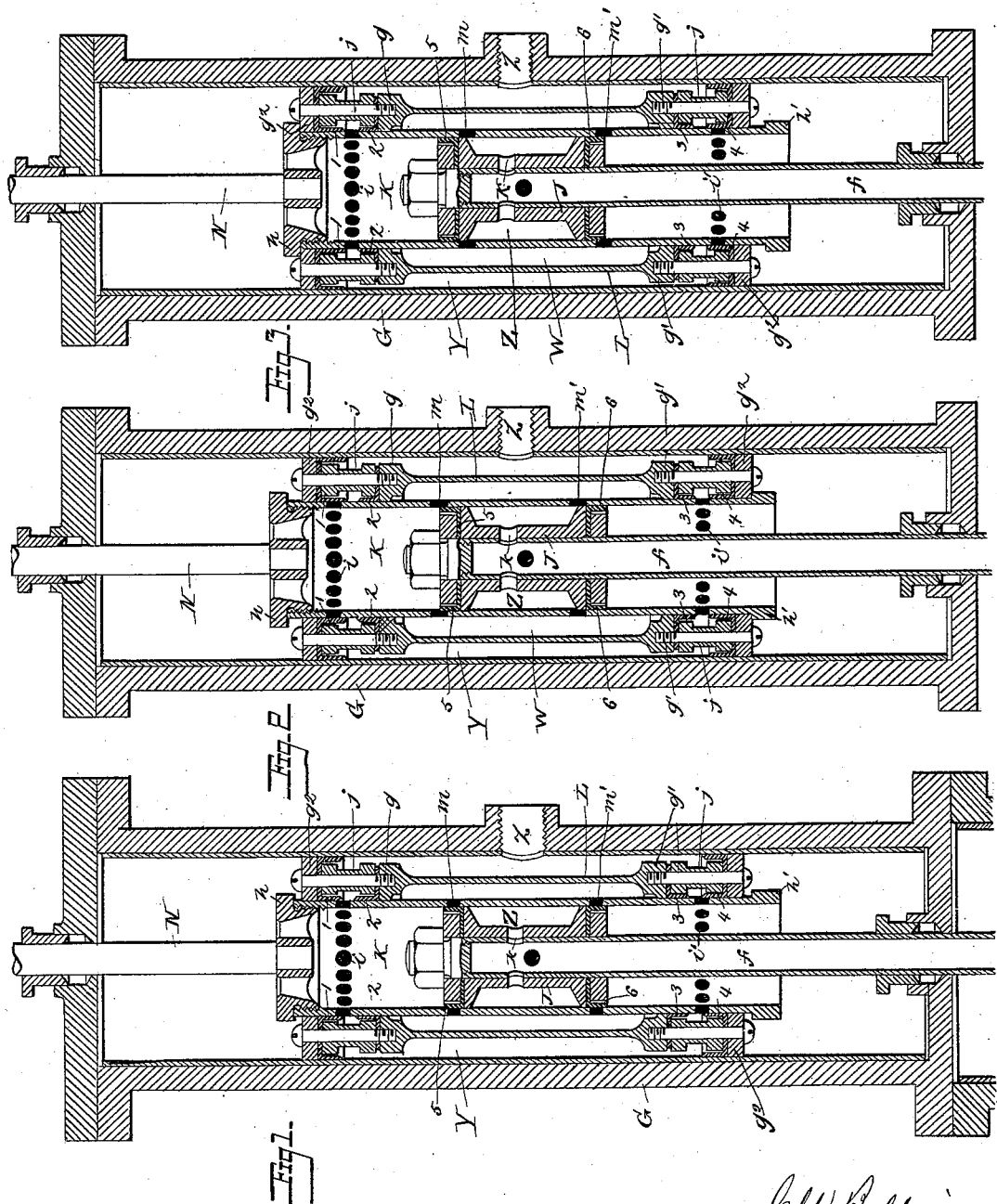

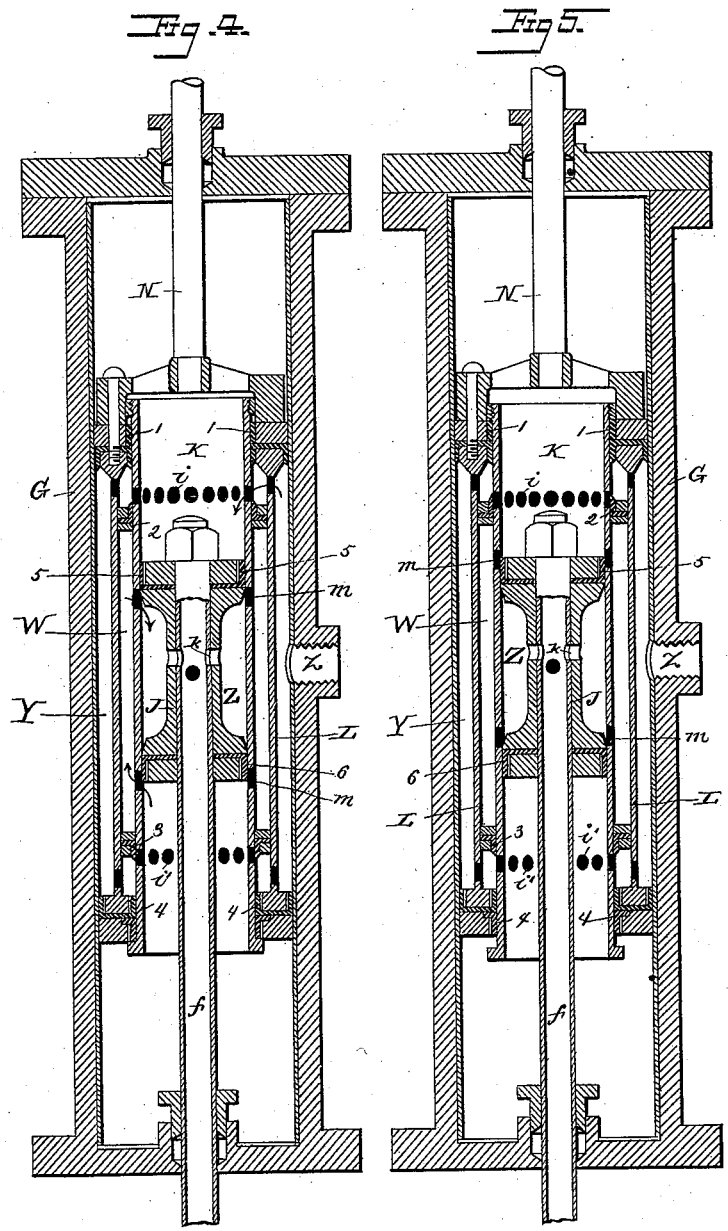

CYRUS W. BALDWIN, OF YONKERS, NEW YORK, ASSIGNOR TO THE HYDRAULIC ELEVATOR COMPANY, OF CHICAGO, ILLINOIS.

VALVE-OPERATING DEVICE FOR ELEVATORS.

SPECIFICATION forming part of Letters Patent No. 352,797, dated November 16, 1886.

Application filed August 2, 1886. Serial No. 209,782. (No model.)

*To all whom it may concern:*

Be it known that I, CYRUS W. BALDWIN, a citizen of the United States, and a resident of Yonkers, Westchester county, New York, have invented certain new and useful Improvements in Valve-Operating Devices for Elevators, of which the following is a specification.

My invention has for its object to facilitate the manipulation of the large valves of elevating-engines; and my invention consists in the construction of an auxiliary operating engine and valve connected to operate the main valve.

In the drawings, Figure 1 is a sectional elevation of the auxiliary valve-operating engine. Figs. 2 and 3 are similar views showing the parts in different positions. Figs. 4 and 5 are sectional elevations of the auxiliary valve-operating engines, showing modifications, the parts being in different positions.

When the elevating-engine is large and the main valve is of extended dimensions and difficult to operate, auxiliary engines have been employed for the purpose of moving the said valve, and the operating cord or rope, usually extended through the cage, instead of being connected to the valve, has been connected to the valve of the auxiliary engine, which is small and easily adjusted, thereby enabling the attendant in the cage to effect the adjustment of the large valve, with but little exertion, through the medium of the auxiliary engine.

In order to secure an exact adjustment of the auxiliary valve and determine with precision the extent of the movement of the auxiliary engine, so as to avoid any possible displacement of the valve, I construct the auxiliary engine and its valve in a manner which I will now describe.

The casing G of the auxiliary engine is connected to or forms part of the case of the main valve device, a hollow valve stem or rod, $f$, extending from the valve through a packed opening in the head of the valve-casing, and carrying at its upper end the auxiliary piston J, which is adapted to an open-ended tube or tubular valve, K, within the casing G, which tube extends through the heads $g$ $g'$ of a cylinder or second tubular valve, L, fitted to slide upon the tube K.

The cylinder L carries at each end a ring, $g^2$, which closes the annular space between the casing G and tube K, and is supported by pillars $j$, bolted to the heads of the cylinder, and the tube K has a limited sliding movement in the cylinder L, determined by shoulders or flanges $h$ $h'$ on the ends of the tube. The diameter of the cylinder L is such as to leave an annular space or channel, Y, between the outside of the cylinder L and the inside of the casing G, and another annular space or channel between the inside of the cylinder L and the outside of the tube K. The cylinder carries four rings, 1 2 3 4, two being arranged near each end and fitting close the outside of the tube K a short distance apart, and these rings are preferably the flanges of packing-rings confined between the pillars $j$ and the heads $g$ $g'$ and rings $g^2$, as shown best in Figs. 1, 2, and 3.

Near the upper end of the tube K is a series of ports, $i$, and near the lower end a like series of ports, $i'$, the two series being at such a distance apart that when the shoulder $h'$ is against the adjacent ring $g^2$, Fig. 2, the ports $i'$ will be in communication with the chamber Y, while the ports $i$ will be covered by the ring 1, and when the shoulder $h$ is against the ring $g^2$, Fig. 3, the ports $i$ will be in communication with the chamber Y, and the ports $i'$ will be covered by the ring 4, the rings 2 and 3 under all circumstances preventing the flow of water from the chamber Y to the chamber W.

The piston J has two heads, or is contracted in diameter at the center to form an annular chamber, Z, which communicates through ports $k$ with the interior of the tubular valve-stem $f$, which extends through to the main valve, and at the opposite end of the piston J are flanged packing-rings 5 and 6.

In the tube K are ports $m$ $m'$, at such a distance apart that when the port $m'$ is covered by the packing-ring 6 the port $m$ will be covered by the packing-ring 5, and when the tube K is moved to carry one of the ports $m$ $m'$ beyond the adjacent end of the piston the other port will form a communication between the chambers W and Z.

The chamber Y receives the motor-fluid under pressure through a port, $z$, communicating with the supply-pipe, or with the circulating-pipe.

The piston J and the tube K constitute the piston and cylinder of an auxiliary engine for moving the main valve, and the cylinder L and its packing-rings constitute the valve of the auxiliary engine, G being the casing, and by moving either the cylinder L or the tube K in relation to each other the pressure may be brought on one or the other side of the piston J, so as to raise or lower the main valve. In Figs. 1 to 3 I have shown connections for shifting the tube K, in order to bring the motor-fluid to bear upon one or the other side of the piston J, and in Figs. 4 and 5 I have shown means for producing the same effect by shifting the cylinder L.

The stem N is connected with any suitable appliances extending to the cage, whereby it may be shifted at the will of the operator within the cage.

When the parts are in the position shown in Fig. 2, the stem N having been lifted to bring the shoulder $h'$ against the ring $g^2$, the water will flow inward through the ports $i'$, and pressure will be brought against the under side of the piston J, which will be lifted, together with the main valve, the water above the piston passing through the ports $m\ m'$ to the chamber Z and out through the discharge pipe or stem $f$, this movement being continued until the rings 5 6 close the ports $m\ m'$, when the further discharge of water above the piston will be prevented and its motion will be arrested. If a further upward movement of the valve is required, an additional draft upon the stem N will lift the tube K and cylinder L, the upward movement of the tube K lifting the ports $m\ m'$ above the rings 5 6, so that the water can flow from above the piston J to the discharge, and by continuing the upward movement of the stem N a continuing following upward movement of the piston J may be secured, while on arresting the upward movement of the stem the movement of the piston will be almost immediately stopped.

When the piston and valve are to be carried downward, the stem N is moved downward so as to bring the shoulder $h$ against the adjacent ring $g^2$, Fig. 3, when the ports $i'$ will be closed by the ring 4, and the ports $i$ will be thrown below the ring 1, so that the water-pressure will be brought upon the top of the piston J, and the latter will move downward, the water from below escaping through the discharge through the ports $m\ m'$ and chambers W and Z, and this movement continuing so long as the stem N is carried downward as fast as the piston J can travel, but ceasing when the downward motion of the stem N is arrested and the piston J descends to bring the rings 5 and 6 in position to close the ports $m\ m'$.

By the above-described arrangement the adjustment of the supplemental cylinder and its valve is made the means of determining the position of the supplemental piston and the main valve to which it is connected, and by continuing the movement of the stem in either direction the movement of the piston and valve in the same direction is maintained, while the force exerted by the operator to move the supplemental parts is but a fraction of that which would be required to move the main valve to the same extent.

It will be seen that the water-pressure within the casing is practically equal upon the opposite ends of the cylinder, rings, and tube, so that all these parts are balanced and move without resistance in the fluid, and that all the movements are upon vertical lines, and that all the joints are packed by annular packings, so that there is comparatively little friction and wear, while any wear that does occur is compensated for by the flexibility of the packings.

The arrangement shown in Figs. 4 and 5 differs from that in the other figures only in the stem N, in the construction shown in said figures being connected to the cylinder L instead of to the tube K, and in a slight difference in the construction of the parts supporting the rings 1 2 3 4. In either case the effect is the same, the first movement of the stem closing one series of ports, $i\ i'$, and opening the other, and the continued movement of the stem causing both the cylinder and the tube to travel together ahead of the piston, which automatically follows in the same direction.

I claim—

1. The combination, with the valve, of a valve-operating engine, consisting of an outer casing, a tube provided with ports $i\ i'\ m\ m'$, a piston, J, sliding in the tube, provided with channels and connected by a hollow stem with the valve, and a cylinder, L, carrying rings 1 2 3 4 $g^2\ g^2$, and a stem, N, and connections, substantially as described, to permit the adjustment of the cylinder in respect to the tube, substantially as set forth.

2. The combination, with the valve, perforated piston J, and stem $f$, of a tube, K, having four series of openings, a cylinder adjustable in respect to the tube between shoulders thereof, and provided with rings 1 2 3 4, and a casing within which the cylinder slides, substantially as set forth.

3. The combination, with the hollow stem connected to a valve, of a perforated piston provided with rings 5 6, a tube provided with four series of ports and with shoulders $h\ h'$, and a cylinder, L, sliding upon the tube and carrying rings 1 2 3 4, and rings $g^2$, and a casing, G, provided with a port communicating with a water-supply, and a stem, N, connected to the tube or cylinder, substantially as described.

4. The combination of the elevator-engine, the valve thereof, the casing G, communicating with the water supply, perforated piston J, connected by a hollow stem to the valve-tube K, provided with ports and shoulders and receiving the piston J, cylinder L, carrying rings 1 2 3 4, and provided with rings closing the space between the tube and the casing, and devices connecting the cylinder or tube with the case, substantially as set forth.

5. The combination, with the piston J, tube K, cylinder L, and casing G, of the flanged packing-rings upon the piston and upon the cylinder, arranged in relation to openings or ports in the tube, substantially as described.

In testimony whereof I have signed my name to this specification in the presence of two subscribing witnesses.

CYRUS W. BALDWIN.

Witnesses:
MATT. H. ELLIS,
WM. H. SWEENY.